US009900063B2

(12) United States Patent
Thiele et al.

(10) Patent No.: US 9,900,063 B2
(45) Date of Patent: Feb. 20, 2018

(54) METHOD AND APPARATUS FOR PROVIDING GENERIC HIERARCHICAL PRECODING CODEBOOKS

(71) Applicants: Huawei Technologies Co., Ltd., Shenzhen (CN); Fraunhofer-Gesellschaft zur Forderung der angewandten Forschung e.V., Munich (DE)

(72) Inventors: Lars Thiele, Berlin (DE); Kai Börner, Berlin (DE); Martin Kurras, Berlin (DE); Thomas Wirth, Munich (DE); Michael Olbrich, Berlin (DE); Thomas Haustein, Potsdam (DE); Malte Schellmann, Munich (DE); Egon Schulz, Munich (DE); Jiayin Zhang, Munich (DE); Yinggang Du, Munich (DE)

(73) Assignees: Huawei Technologies Co., Ltd., Shenzhen (CN); Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 6 days.

(21) Appl. No.: 14/744,796

(22) Filed: Jun. 19, 2015

(65) Prior Publication Data

US 2015/0326296 A1 Nov. 12, 2015

Related U.S. Application Data

(63) Continuation of application No. PCT/EP2012/076843, filed on Dec. 21, 2012.

(51) Int. Cl.

*H04W 4/00* (2009.01)
*H04B 7/024* (2017.01)

(Continued)

(52) U.S. Cl.

CPC ........... *H04B 7/024* (2013.01); *H04B 7/0486* (2013.01); *H04B 7/063* (2013.01); *H04B 7/0689* (2013.01); *H04B 7/022* (2013.01); *H04B 7/0639* (2013.01)

(58) Field of Classification Search

CPC .............. H04W 72/042; H04W 88/085; H04L 5/0037; H04L 5/0053; H04L 5/0048; H04B 7/024

(Continued)

(56) References Cited

U.S. PATENT DOCUMENTS

2010/0239036 A1 9/2010 Koo et al.
2012/0020425 A1 1/2012 Lee et al.

(Continued)

FOREIGN PATENT DOCUMENTS

CN 102006106 A 4/2011
CN 102170335 A 8/2011

(Continued)

OTHER PUBLICATIONS

"3rd Generation Partnership Project; Technical Specification Group Radio Access Network; Evolved Universal Terrestrial Radio Access(E-UTRA); Physical Channels and Modulation(Release 11)," 3GPP TS 36.211, V11.1.0, 3rd Generation Partnership Project, Valbonne, France (Dec. 2012).

*Primary Examiner* — Chi H Pham
*Assistant Examiner* — Alexander O Boakye
(74) *Attorney, Agent, or Firm* — Leydig, Voit & Mayer, Ltd.

(57) ABSTRACT

A base band unit, BBU, in a wireless cellular heterogeneous network, the BBU being provided in a transmission node cluster, TNC, of transmission nodes, TNs, of neighboring cells of the wireless cellular heterogeneous network, wherein the BBU comprises generic hierarchical precoding (Continued)

codebooks, CBs, each CB comprising cluster precoding matrices, CPMs, and each CPM is provided for a possible combination of active TNs within the TNC.

16 Claims, 17 Drawing Sheets

(51) Int. Cl.
*H04B 7/04* (2017.01)
*H04B 7/06* (2006.01)
*H04B 7/022* (2017.01)

(58) Field of Classification Search
USPC .................................................. 370/328, 329
See application file for complete search history.

(56) References Cited

U.S. PATENT DOCUMENTS

| | | | |
|---|---|---|---|
| 2012/0106388 A1 | 5/2012 | Shimezawa et al. | |
| 2012/0314793 A1 | 12/2012 | Kang et al. | |
| 2013/0100907 A1* | 4/2013 | Liu ....................... | H04L 5/0023 370/329 |

FOREIGN PATENT DOCUMENTS

| | | | |
|---|---|---|---|
| CN | 102461249 | A | 5/2012 |
| CN | 102546080 | A | 7/2012 |
| EP | 2490345 | A2 | 8/2012 |
| GB | 2491423 | A | 12/2012 |
| WO | 2012105793 | A2 | 8/2012 |

* cited by examiner

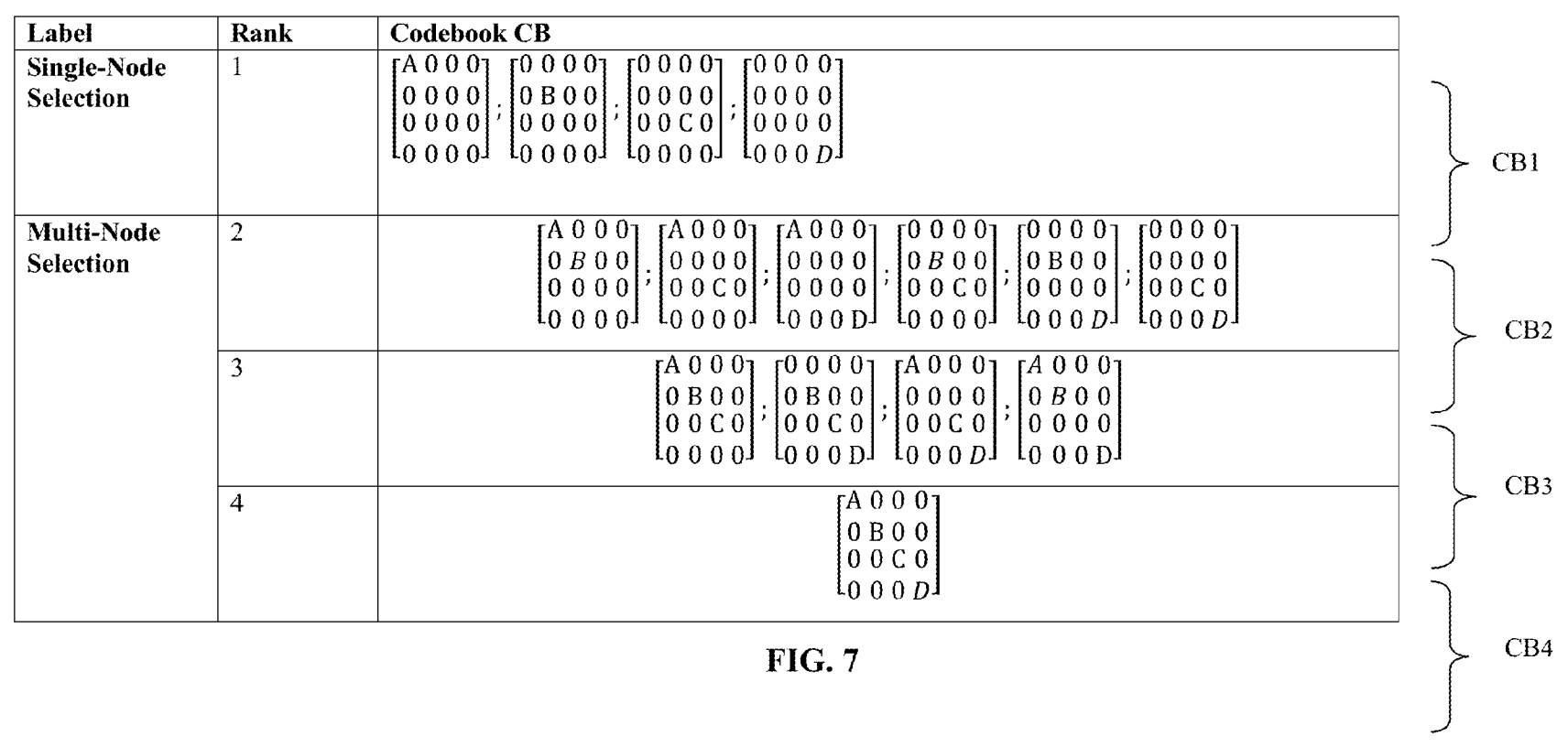

| Label | Rank | Codebook CB |
|---|---|---|
| **Single-Node Selection** | 1 | $\begin{bmatrix} A&0&0&0\\0&0&0&0\\0&0&0&0\\0&0&0&0 \end{bmatrix};\begin{bmatrix} 0&0&0&0\\0&B&0&0\\0&0&0&0\\0&0&0&0 \end{bmatrix};\begin{bmatrix} 0&0&0&0\\0&0&0&0\\0&0&C&0\\0&0&0&0 \end{bmatrix};\begin{bmatrix} 0&0&0&0\\0&0&0&0\\0&0&0&0\\0&0&0&D \end{bmatrix}$ |
| **Multi-Node Selection** | 2 | $\begin{bmatrix} A&0&0&0\\0&B&0&0\\0&0&0&0\\0&0&0&0 \end{bmatrix};\begin{bmatrix} A&0&0&0\\0&0&0&0\\0&0&C&0\\0&0&0&0 \end{bmatrix};\begin{bmatrix} A&0&0&0\\0&0&0&0\\0&0&0&0\\0&0&0&D \end{bmatrix};\begin{bmatrix} 0&0&0&0\\0&B&0&0\\0&0&C&0\\0&0&0&0 \end{bmatrix};\begin{bmatrix} 0&0&0&0\\0&B&0&0\\0&0&0&0\\0&0&0&D \end{bmatrix};\begin{bmatrix} 0&0&0&0\\0&0&0&0\\0&0&C&0\\0&0&0&D \end{bmatrix}$ |
| | 3 | $\begin{bmatrix} A&0&0&0\\0&B&0&0\\0&0&C&0\\0&0&0&0 \end{bmatrix};\begin{bmatrix} 0&0&0&0\\0&B&0&0\\0&0&C&0\\0&0&0&D \end{bmatrix};\begin{bmatrix} A&0&0&0\\0&0&0&0\\0&0&C&0\\0&0&0&D \end{bmatrix};\begin{bmatrix} A&0&0&0\\0&B&0&0\\0&0&0&0\\0&0&0&D \end{bmatrix}$ |
| | 4 | $\begin{bmatrix} A&0&0&0\\0&B&0&0\\0&0&C&0\\0&0&0&D \end{bmatrix}$ |

FIG. 7

| Label | Rank | Codebook CB |
| --- | --- | --- |
| **Single-Antenna Selection** | 1 | $\begin{bmatrix}1&0&0&0\\0&0&0&0\\0&0&0&0\\0&0&0&0\end{bmatrix};\begin{bmatrix}0&0&0&0\\0&1&0&0\\0&0&0&0\\0&0&0&0\end{bmatrix};\begin{bmatrix}0&0&0&0\\0&0&0&0\\0&0&1&0\\0&0&0&0\end{bmatrix};\begin{bmatrix}0&0&0&0\\0&0&0&0\\0&0&0&0\\0&0&0&1\end{bmatrix}$ |
| **Multi-Antenna Selection** | 2 | $\begin{bmatrix}1&0&0&0\\0&1&0&0\\0&0&0&0\\0&0&0&0\end{bmatrix};\begin{bmatrix}1&0&0&0\\0&0&0&0\\0&0&1&0\\0&0&0&0\end{bmatrix};\begin{bmatrix}1&0&0&0\\0&0&0&0\\0&0&0&0\\0&0&0&1\end{bmatrix};\begin{bmatrix}0&0&0&0\\0&1&0&0\\0&0&1&0\\0&0&0&0\end{bmatrix};\begin{bmatrix}0&0&0&0\\0&1&0&0\\0&0&0&0\\0&0&0&1\end{bmatrix};\begin{bmatrix}0&0&0&0\\0&0&0&0\\0&0&1&0\\0&0&0&1\end{bmatrix}$ |
| | 3 | $\begin{bmatrix}1&0&0&0\\0&1&0&0\\0&0&1&0\\0&0&0&0\end{bmatrix};\begin{bmatrix}0&0&0&0\\0&1&0&0\\0&0&1&0\\0&0&0&1\end{bmatrix};\begin{bmatrix}1&0&0&0\\0&0&0&0\\0&0&1&0\\0&0&0&1\end{bmatrix};\begin{bmatrix}1&0&0&0\\0&1&0&0\\0&0&0&0\\0&0&0&1\end{bmatrix}$ |
| | 4 | $\begin{bmatrix}1&0&0&0\\0&1&0&0\\0&0&1&0\\0&0&0&1\end{bmatrix}$ |

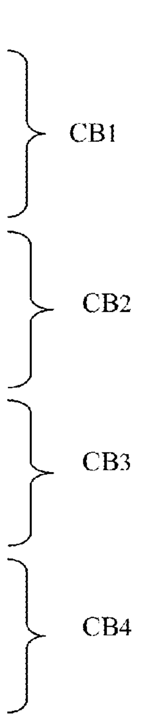

Fig. 8

| Label | RRU Rank $\mathcal{R}$ | Codebook $\mathcal{CB}$ |
|---|---|---|
| Single-RRU Selection | 1 | $\begin{bmatrix} \begin{bmatrix} 1 & 1 \\ j & -j \end{bmatrix} & 0 & 0 & 0 \\ 0 & 0 & 0 & 0 \\ 0 & 0 & 0 & 0 \\ 0 & 0 & 0 & 0 \end{bmatrix}$; $\begin{bmatrix} 0 & 0 & 0 & 0 \\ 0 & \begin{bmatrix} 1 & 1 \\ j & -j \end{bmatrix} & 0 & 0 \\ 0 & 0 & 0 & 0 \\ 0 & 0 & 0 & 0 \end{bmatrix}$; $\begin{bmatrix} 0 & 0 & 0 & 0 \\ 0 & 0 & 0 & 0 \\ 0 & 0 & \begin{bmatrix} 1 & 1 \\ j & -j \end{bmatrix} & 0 \\ 0 & 0 & 0 & 0 \end{bmatrix}$; $\begin{bmatrix} 0 & 0 & 0 & 0 \\ 0 & 0 & 0 & 0 \\ 0 & 0 & 0 & 0 \\ 0 & 0 & 0 & \begin{bmatrix} 1 & 1 \\ j & -j \end{bmatrix} \end{bmatrix}$ |
| Multi-RRU Selection | 2 | $\begin{bmatrix} \begin{bmatrix} 1 & 1 \\ j & -j \end{bmatrix} & 0 & 0 & 0 \\ 0 & \begin{bmatrix} 1 & 1 \\ j & -j \end{bmatrix} & 0 & 0 \\ 0 & 0 & 0 & 0 \\ 0 & 0 & 0 & 0 \end{bmatrix}$; $\begin{bmatrix} \begin{bmatrix} 1 & 1 \\ j & -j \end{bmatrix} & 0 & 0 & 0 \\ 0 & 0 & 0 & 0 \\ 0 & 0 & \begin{bmatrix} 1 & 1 \\ j & -j \end{bmatrix} & 0 \\ 0 & 0 & 0 & 0 \end{bmatrix}$; $\begin{bmatrix} \begin{bmatrix} 1 & 1 \\ j & -j \end{bmatrix} & 0 & 0 & 0 \\ 0 & 0 & 0 & 0 \\ 0 & 0 & 0 & 0 \\ 0 & 0 & 0 & \begin{bmatrix} 1 & 1 \\ j & -j \end{bmatrix} \end{bmatrix}$; $\begin{bmatrix} 0 & 0 & 0 & 0 \\ 0 & \begin{bmatrix} 1 & 1 \\ j & -j \end{bmatrix} & 0 & 0 \\ 0 & 0 & \begin{bmatrix} 1 & 1 \\ j & -j \end{bmatrix} & 0 \\ 0 & 0 & 0 & 0 \end{bmatrix}$; $\begin{bmatrix} 0 & 0 & 0 & 0 \\ 0 & \begin{bmatrix} 1 & 1 \\ j & -j \end{bmatrix} & 0 & 0 \\ 0 & 0 & 0 & 0 \\ 0 & 0 & 0 & \begin{bmatrix} 1 & 1 \\ j & -j \end{bmatrix} \end{bmatrix}$; $\begin{bmatrix} 0 & 0 & 0 & 0 \\ 0 & 0 & 0 & 0 \\ 0 & 0 & \begin{bmatrix} 1 & 1 \\ j & -j \end{bmatrix} & 0 \\ 0 & 0 & 0 & \begin{bmatrix} 1 & 1 \\ j & -j \end{bmatrix} \end{bmatrix}$ |
| | 3 / 4 | According to scheme from RRU Rank 1 or 2 |

Fig.9

| Label | Rank | Codebook |
| --- | --- | --- |
| **2SFN** | 1 | $\begin{bmatrix}1&0&0&0\\1&0&0&0\\0&0&0&0\\0&0&0&0\end{bmatrix};\begin{bmatrix}1&0&0&0\\0&0&0&0\\1&0&0&0\\0&0&0&0\end{bmatrix};\begin{bmatrix}1&0&0&0\\0&0&0&0\\0&0&0&0\\1&0&0&0\end{bmatrix};\begin{bmatrix}0&0&0&0\\1&0&0&0\\1&0&0&0\\0&0&0&0\end{bmatrix};\begin{bmatrix}0&0&0&0\\1&0&0&0\\0&0&0&0\\1&0&0&0\end{bmatrix};\begin{bmatrix}0&0&0&0\\0&0&0&0\\1&0&0&0\\1&0&0&0\end{bmatrix}$ |
| **3SFN** | 1 | $\begin{bmatrix}1&0&0&0\\1&0&0&0\\1&0&0&0\\0&0&0&0\end{bmatrix};\begin{bmatrix}0&0&0&0\\1&0&0&0\\1&0&0&0\\1&0&0&0\end{bmatrix};\begin{bmatrix}1&0&0&0\\0&0&0&0\\1&0&0&0\\1&0&0&0\end{bmatrix};\begin{bmatrix}1&0&0&0\\1&0&0&0\\0&0&0&0\\1&0&0&0\end{bmatrix}$ |
| **4SFN** | 1 | $\begin{bmatrix}1&0&0&0\\1&0&0&0\\1&0&0&0\\1&0&0&0\end{bmatrix}$ |
| **R2 2SFN** | 2 | $\begin{bmatrix}1&0&0&0\\1&0&0&0\\0&1&0&0\\0&1&0&0\end{bmatrix};\begin{bmatrix}1&0&0&0\\0&1&0&0\\1&0&0&0\\0&1&0&0\end{bmatrix};\begin{bmatrix}1&0&0&0\\0&1&0&0\\0&1&0&0\\1&0&0&0\end{bmatrix}$ |

FIG. 10

MTP-OM

PTP-OM

| Mode | Number of CBs |
| --- | --- |
| Rank 1 | 4 |
| Rank 2 | 6 |
| Rank 3 | 4 |
| Rank 4 | 1 |
| 2 SFN | 6 |
| 3 SFN | 4 |
| 4 SFN | 1 |
| R2 - 2 SFN | 3 |
| All | 29 |

Fig.15

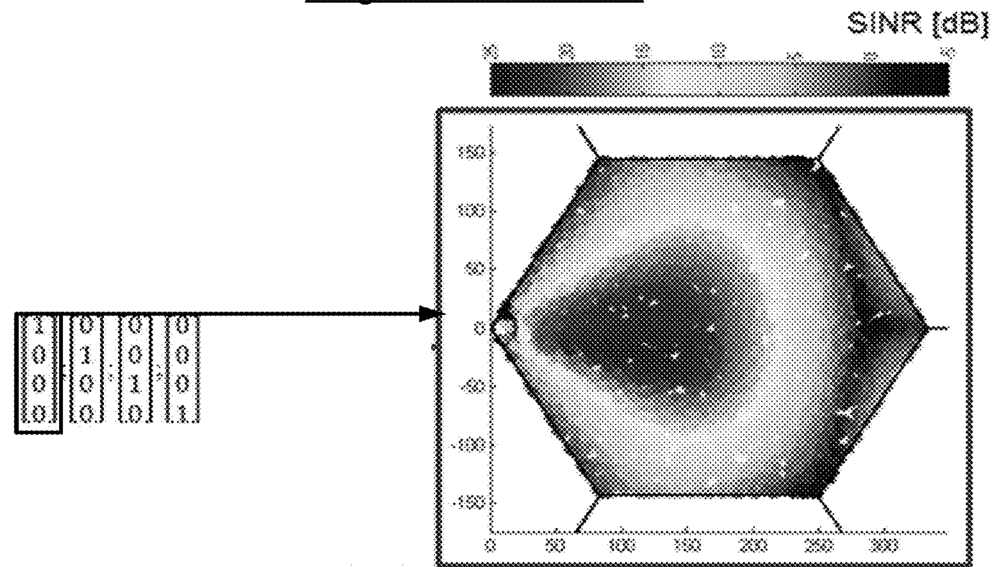
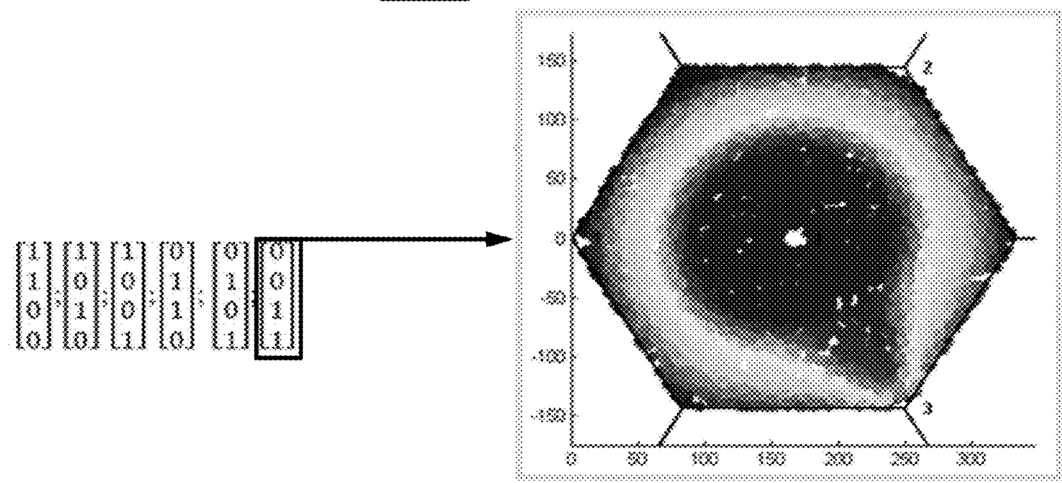
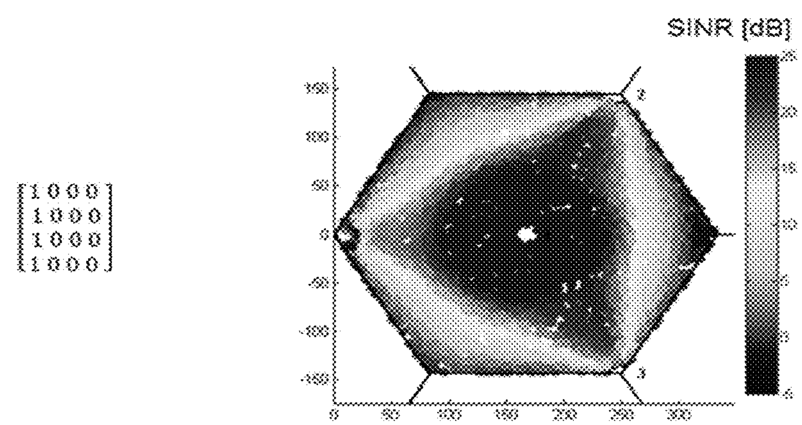
Fig.16

2 transmit antenna: → Multi-node selection
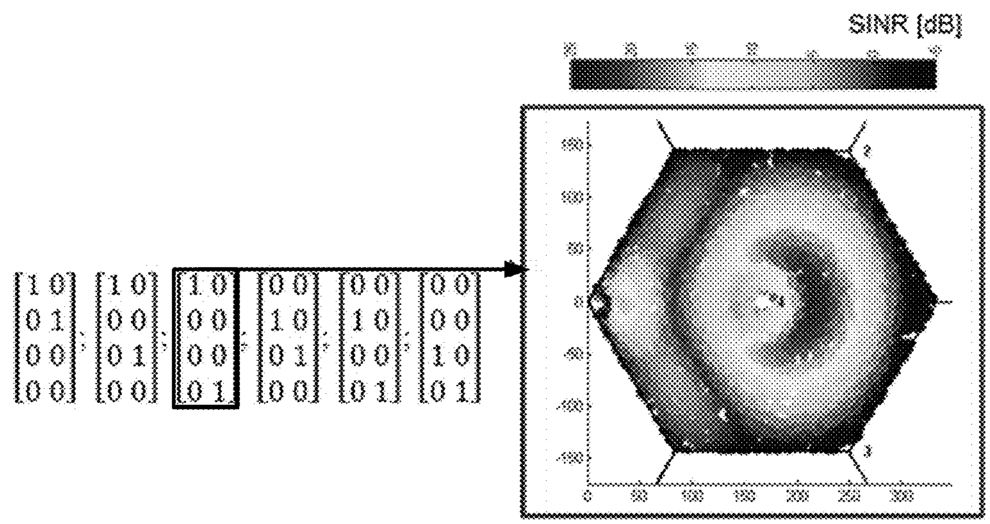
4 transmit antennas: →2SFN R2
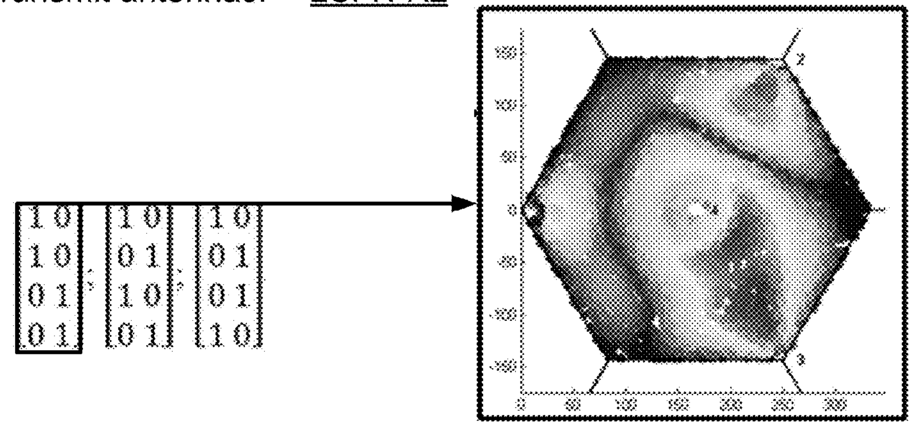
Fig.17

$$\begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

METHOD AND APPARATUS FOR PROVIDING GENERIC HIERARCHICAL PRECODING CODEBOOKS

CROSS-REFERENCE TO RELATED APPLICATIONS

This application is a continuation of International Patent Application No. PCT/EP2012/076843, filed on Dec. 21, 2012, which is hereby incorporated by reference in its entirety.

TECHNICAL BACKGROUND

The present invention relates to a base band unit of a transmission node cluster of transmission nodes in a wireless cellular network, to a wireless cellular heterogeneous network comprising at least a transmission node cluster, and to a method for providing generic hierarchical precoding codebooks in a wireless cellular heterogeneous network.

In the present patent application, the following abbreviations are used:

BBU Base band unit
CAS Central Antenna System
CQI Channel Quality Indicator
CB Codebook
CPM Cluster Precoding Matrix
DAS Distributed Antenna System,
MTP Multipoint-To-Point
MIMO Multiple Input Multiple Output
OM Operation Mode
PTP Point-To-Point
PM Precoding Matrix
PMI Precoding Matrix Indicator
RI Rank Indicator
RRU Remote Radio Unit
SNR Signal to Noise ratio
SINR Signal to interference and noise ratio
TN Transmission Node
TNC Transmission Node Cluster
UE User Equipment A wireless cellular network can comprise a plurality of cells, wherein each cell comprises a base station, and a BBU. In DAS systems RRUs with one or more antennas are provided to enhance the coverage and capacity in the wireless cellular network. In a DAS the RRUs can be connected to the base station via a high bandwidth and low latency link. In a cellular wireless network the RRUs are used in a DAS to provide more uniform coverage, reduced outage and higher throughputs especially in shadowed and indoor locations. A DAS can be combined with a MIMO communication system by using the RRUs as a distributed antenna array and/or equipping the RRUs with multiple antennas. In a homogeneous wireless network the cells of the wireless cellular network are of similar shape and size. In contrast, in a wireless cellular heterogeneous network cells of the network are of different size and type.

In a MIMO system which can be provided in a DAS, more than one transmission antenna can be used to send a signal on the same frequency to more than one reception antenna. Conventional cellular networks generally provide a best service under line of sight conditions. In a MIMO system rich scattering conditions can be exploited by signals which bounce around in the environment. Under rich scattering conditions signals from different transmit antennas can take multiple paths to reach a UE at different times. A radio frequency signal path from a transmitting antenna to a receiving antenna is gradually weakened, while interference from other radio frequency signals reduces the SINR of the signal. In addition, in crowded environments, the radio frequency signal frequently encounters objects which alter its path or degrade the signal. A multiple antenna system can compensate for some of the loss of the SNR due to multipath conditions by combining signals that have different fading characteristics.

To achieve throughput gains where the signal-to-noise ratio is relatively high, a wireless cellular network can use a MIMO technique called spatial multiplexing. In spatial multiplexing each transmitting antenna sends a different data stream to a multiple receiving antenna. These data streams are then reconstructed separately by the UE.

With spatial multiplexing, one can transmit different signals at the same time over the same frequency. With spatial multiplexing it is possible to increase the transmission data rate. To do this, the data is divided in two separate streams, wherein the streams are transmitted independently via separate antennas or groups of antennas.

Each set of data sent through the antennas in spatial multiplexing operation is called a layer. In spatial multiplexing, rank refers to the number of data streams transmitted over the same time-frequency resource, corresponding to the number of layers.

A cellular wireless network can be operated in a closed loop or an open loop mode. It is possible that a base station communicates with the UE in an open loop when the UE is moving too fast to provide a detailed report on channel conditions on time for the base station, to select a PM. In open loop operations, the base station receives only minimal information from the UE.

In a closed loop operation of the wireless network the UE can analyze the channel conditions between a transmit and receive antenna including the multipath conditions. The UE then provides a RI as well as a PMI which determines the optimal PM for the current channel conditions. Finally, the UE can provide a CQI given the RI and the PMI rather than basing the CQI only on the current OM. This allows the base station to quickly and effectively adapt the transmission of data to the current MIMO channel conditions. Closed loop operation of the wireless network is particularly relevant for spatial multiplexing where the MIMO system offers the greatest throughput gains.

FIG. 1 shows a diagram for illustrating spatial multiplexing as employed in a conventional wireless cellular network. Spatial multiplexing works by creating separate data streams on multiple antennas. With spatial multiplexing, independent data streams can be transmitted simultaneously on the same frequency resource by mapping them to so called spatial layers. The number of spatial layers is the same as the rank, R, of the precoding matrix used for data transmissions.

As shown in FIG. 1 in a multi layer transmission, data arriving from a higher level process comprises codewords. Each codeword is then mapped onto one or more layers. Each layer is then mapped onto one or more antennas using a precoding matrix.

To determine how to map the layers to antenna the complete N×M dimensional signal space is evaluated. For the layers the rank R of the N×M Matrix is decisive.

The PMs used by the base station are stored in a so-called CB. Accordingly, a CB comprises a set of PMs used for precoding in a downlink data transmission between a base station and a UE.

In a wireless cellular heterogeneous network the cells are of different type and size and comprise macrocells, microcells as well as picocells. In a distributed heterogeneous antenna setup a UE in general experiences a different channel gain to each distributed RRU of the heterogeneous network which may be equipped with multiple antennas.

Multiplexing within a wireless cellular network is a possible way to increase capacity and coverage in the wireless network. This can either be achieved by using massive, distributed antenna configurations or by introducing small cells into a macrocellular grid of the wireless network. However, the introduction of more cells within the wireless cellular network using the same frequency does at the same time introduce more interference among neighboring cells.

In particular for a DAS all RRUs can be connected to a BBU using for instance optical fibers. In a closed loop operation the UE does report feedback information on the channel conditions in terms of a PMI, a CQI and a RI. In a conventional wireless cellular network the precoding CBs comprising the PMs are intended for a CAS with a predetermined maximum number of transmit antenna ports. Accordingly, in conventional wireless cellular networks precoding CBs are only considered for CAS and thus lack a suitable definition of CBs for a DAS. The same holds for a heterogeneous network where precoding is treated in each BBU or TN within the heterogeneous network. In contrast to a conventional DAS where all RRUs are connected to the same BBU feedback and control information must be exchanged between TNs of a heterogeneous network in order to achieve a certain degree of coordination between them.

Accordingly, there is a need for a method and an apparatus for providing generic hierarchical precoding CBs for a wireless cellular heterogeneous network/SUMMARY According to a first aspect of the present invention, a BBU in a wireless cellular heterogeneous network is provided, the BBU being provided in a TNC of TNs of neighbouring cells of the wireless cellular heterogeneous network, wherein the BBU comprises generic hierarchical precoding CBs, each CB comprising CPMs, and each CPM is provided for a possible combination of active TNs within the TNC.

In a first possible implementation form of the BBU according to the first aspect of the present invention, each CPM provided for a possible combination of active TNs within the TNC is constructed on the basis of PMs associated with the active TNs.

In a second possible implementation form of the BBU according to the first aspect of the present invention or according to the first implementation form of the first aspect of the present invention, the CPMs having the same rank form a generic hierarchical precoding CB for the respective TNC.

In a third possible implementation form of the BBU according to the first aspect of the present invention as such or according to any of the preceding implementation forms of the first aspect of the present invention, the CPM of the TNC is a N×M matrix comprising the PMs of all active TNs of the TNC, wherein N is the number of TNs in the TNC and M is the number of supported global spatial layers in the TNC, with M≤N.

In a fourth possible implementation form of the BBU according to the first aspect of the present invention as such or according to any of the preceding implementation forms of the first aspect of the present invention, a rank R of the CPM of the TNC corresponds to the number of spatial layers that are active in the TNC, with R≤M≤N.

In a fifth possible implementation form of the BBU according to the first aspect of the present invention as such or according to any of the preceding implementation forms of the first aspect of the present invention, a number Z of all CPMs having the same rank and forming a generic hierarchical precoding CB for the respective TNC is given by:

$$Z = \binom{N}{A} = \frac{N!}{(N-A)!A!},$$

wherein N is the number of all TNs in the TNC and A is the number of the active TNs in the TNC, wherein A is equal to R.

In a sixth possible implementation form of the BBU according to the first aspect of the present invention as such or according to any of the preceding implementation forms of the first aspect of the present invention, the CPM of the TNC is stored in a CB memory of a coordinating BBU of the TN within the TNC and is adjustable by the coordinating BBU.

In a seventh possible implementation form of the BBU according to the first aspect of the present invention as such or according to any of the preceding implementation forms of the first aspect of the present invention, the BBU is a coordinating BBU of the TNC and is adapted to select an OM used for a registered UE, depending on at least a calculated signal quality metric of a reception signal at the registered UE and/or reception signals of other UEs registered with a TN of the TNC.

In an eighth possible implementation form of the BBU according to the seventh implementation form of the first aspect of the present invention, the BBU is further adapted to select a hierarchical precoding CB for the selected OM, and to select a CPM within the selected hierarchical precoding CB, depending on the signal quality metric of a reception signal at the registered UE and/or reception signals of other UEs registered with a TN of the TNC.

In a ninth possible implementation form of the BBU according to the seventh or eighth implementation form of the first aspect of the present invention, the BBU is further adapted to offer different hierarchical precoding CBs in different time slots to the registered UE, wherein the registered UE is adapted to select a CPM within an offered hierarchical precoding CB, depending on a signal quality metric of a reception signal at the registered UE.

In a tenth possible implementation form of the BBU according to the first aspect of the present invention as such or according to any of the second to ninth implementation forms of the first aspect of the present invention, each PM of the TN included in the CPM of the TNC is a T×L matrix, wherein T is the number of antennas of the respective TN and L is the number of spatial layers supported by the TN, with L≤T.

In an eleventh possible implementation form of the BBU according to the first aspect of the present invention as such or according to any of the second to tenth implementation forms of the first aspect of the present invention, the PM of the TN included in the CPM of the TNC is adjustable by the BBU of the respective TN.

In a twelfth possible implementation form of the BBU according to the first aspect of the present invention as such or according to any of the preceding implementation forms of the first aspect of the present invention, the CPM of the TNC is stored in a CB memory of the BBU.

In a thirteenth possible implementation form of the BBU according to the seventh or eighth implementation form of the first aspect of the present invention, the signal quality metric comprises an SINR.

In a fourteenth possible implementation form of the BBU according to the first aspect of the present invention as such or according to any of the preceding implementation forms of the first aspect of the present invention, each CPM comprises an associated PMI.

According to a second aspect of the present invention, a wireless cellular heterogeneous network is provided, comprising at least a TNC, wherein the TNC comprises TNs of neighbouring cells and comprises at least a BBU, wherein the BBU comprises generic hierarchical precoding CBs, each CB comprising CPMs, and each CPM is provided for a possible combination of active TNs within the TNC.

In a first possible implementation form of the wireless cellular heterogeneous network according to the second aspect of the present invention, each TN comprises an associated PM and each CPM provided for a possible combination of active TNs within the TNC is constructed on the basis of PMs associated with the active TNs.

In a second possible implementation form of the wireless cellular heterogeneous network according to the second aspect of the present invention or according to the first implementation form of the first aspect of the present invention, the TNC is adapted to support different spatial layers provided for data transmission between at least a TN of the TNC and at least a UE registered with a TN of the TNC.

In a third possible implementation form of the wireless cellular heterogeneous network according to the second aspect of the present invention as such or according to any of the preceding implementation forms of the second aspect of the present invention, the wireless heterogeneous network is operated in different OMs, comprising a PTP-OM and a MTP-OM, wherein in the PTP-OM a UE registered with a TN of the TNC has a transmission link to a single TN of the TNC, to transmit a signal to the registered UE, wherein in the MTP-OM a UE registered with a TN of the TNC has transmission links to a scalable number of TNs of the TNC, wherein through each transmission link an identical signal is transmitted to the registered UE.

In a fourth possible implementation form of the wireless cellular heterogeneous network according to the second aspect of the present invention as such or according to any of the preceding implementation forms of the second aspect of the present invention, a backhaul interface provided between BBUs of the TNC comprises a minimum bandwidth being reserved to exchange messages with control information relating to selected CPMs, depending on the total number of CPMs in all hierarchical precoding CBs of any rank.

According to a third aspect of the present invention, a method for providing generic hierarchical CBs in a wireless cellular heterogeneous network is provided, the wireless cellular heterogeneous network comprising at least a TNC, wherein the TNC comprises TNs of neighbouring cells, and comprises at least a BBU, wherein the BBU comprises generic hierarchical precoding CBs, each CB comprising CPMs, and each CPM is provided for a possible combination of active TNs within the TNC.

In a first possible implementation form of the method according to the third aspect of the present invention, each CPM provided for a possible combination of active TNs within the TNC is constructed on the basis of PMs associated with the active TNs In a second possible implementation form of the method according to the third aspect of the present invention as such or according to the first implementation form of the second aspect of the present invention, the CPMs having the same rank form a generic hierarchical precoding CB for the respective TNC.

In a further possible implementation form a computer program for implementing the method according to the third aspect of the present invention as such or according to any of the preceding implementation forms of the third aspect is provided.

The generic implementation used by the different aspects of the present invention provide a simple scheme for adapting the spatial precoding for signal transmission to a UE in a heterogenous network and/or DAS allowing to achieve a high throughput on link as well on system level while keeping the required amount of feedback between UEs and the BBU low.

BRIEF DESCRIPTION OF THE FIGURES

In the following, possible implementations of different embodiments of the present invention are described with reference to the enclosed figures in more detail.

FIG. 7 shows an example of generic hierarchical precoding CBs in a DAS provided by a method;

FIG. 8 shows an example for generic hierarchical precoding CBs used in a DAS with single antenna TNs;

FIG. 9 shows an example of generic hierarchical precoding CBs for a heterogeneous network with multi-antenna TNs;

FIG. 10 shows a further example for generic hierarchical precoding CBs for use in an MTP OM of the wireless cellular heterogeneous network according to an embodiment of the present invention;

FIG. 15 shows a table of CBs which can be used for different OMs according to a possible embodiment of the present invention;

FIGS. 16, 17 and 18 show simulation plots for different scenarios for illustrating the operation of the method according to the present invention.

DETAILED DESCRIPTION OF POSSIBLE EMBODIMENTS

Figure 1:
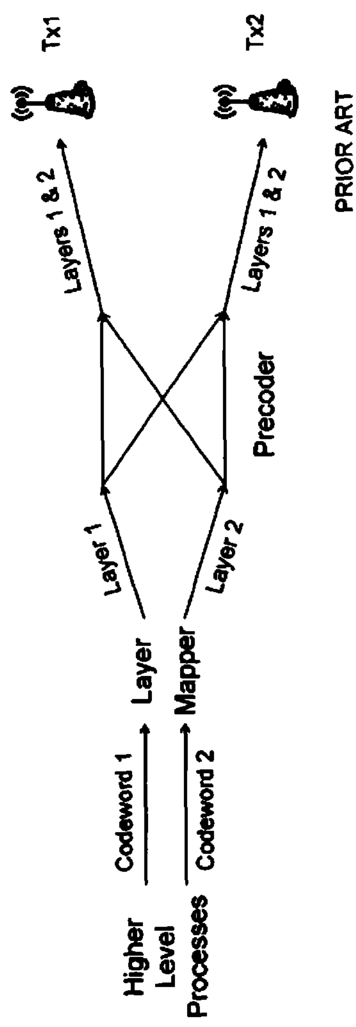
FIG. 1 shows a schematic diagram of a precoding scheme as employed in a conventional cellular wireless network.
Figure 2:
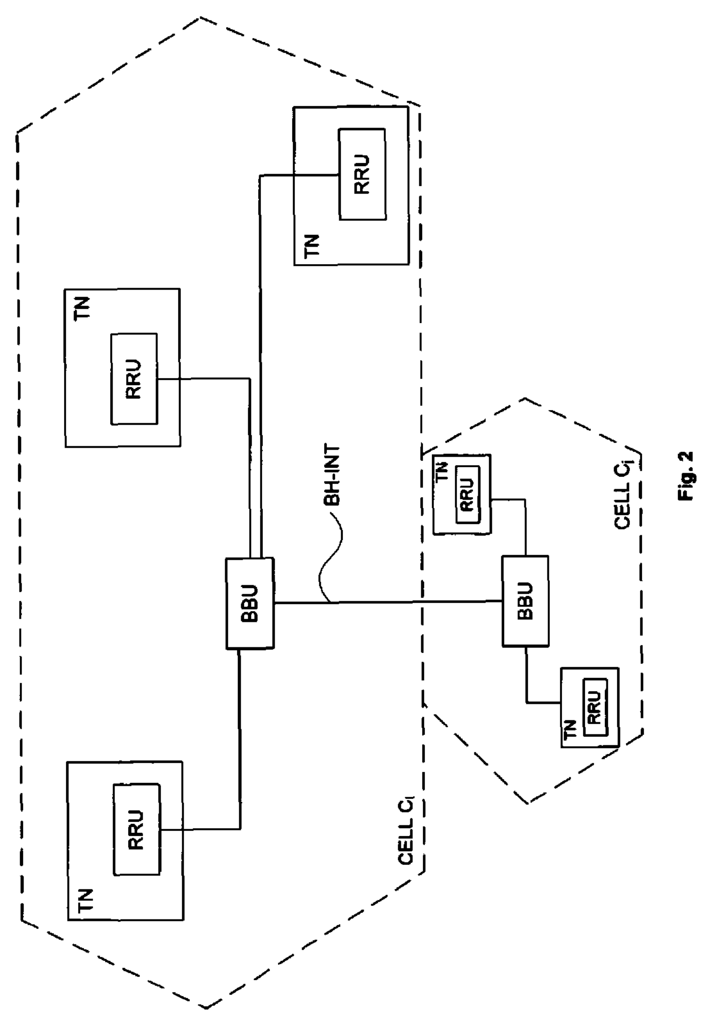
FIG. 2 shows a schematic diagram for illustrating cells within a wireless cellular heterogeneous network according to an embodiment of the present invention.

FIG. 2 shows a structure of different cells $C_i$, $C_j$ within a wireless cellular heterogeneous network of a DAS according to an embodiment of the present invention. As can be seen in FIG. 2, two exemplary cells $C_i$, $C_j$ of the wireless cellular heterogeneous network, which are neighbouring each other, are connected to each other via a backhaul interface such as the X2 interface of an LTE network. Each cell $C_i$, $C_j$ comprises in the shown exemplary implementation a BBU to which at least one RRU is connected. The cells of the wireless cellular heterogeneous network can be of different size and type. For instance, in the example of FIG. 2 the upper cell $C_j$ is a macrocell of a considerable size, whereas the lower cell $C_j$ covers a smaller area. The wireless cellular heterogeneous network according to an embodiment of the present invention can comprise cells $C_i$, $C_j$ of different size and types including macrocells, microcells, picocells as well as femtocells. A macrocell can have a diameter of more than one kilometer and a microcell can have a diameter of several hundred meters. A picocell can cover an area with a diameter of approximately 100 meter, whereas a femtocell can be restricted to a cell size with a diameter of 30 meter. Each of the cells $C_i$, including macrocells, microcells, picocells and even femtocells can comprise a corresponding BBU. The BBUs of the different cells $C_i$, $C_j$ are connected to each other via the backhaul interface. This backhaul interface can be used for exchanging control information and coordination data between the BBUs of the different cells $C_i$, $C_j$. The DAS shown in FIG. 2 comprises RRUs with one or more antennas to enhance coverage and capacity in the wireless cellular network. RRUs can be provided in TNs which are connected to the BBU via a bandwidth and low latency link. The BBU can be located in a base station of the respective cell. The DAS forms a network of spatially separated antenna nodes or TNs connected to a common source via a transport medium that provides a wireless service within a geographic area or structure. In the DAS the transmitted power is split among several antenna elements separated in space so as to provide coverage over the same area with a single antenna but with reduced total power and improved reliability. In this way, a single antenna radiating a relatively high power is replaced by a group of low-power antennas to cover the same area. Consequently, less power is wasted by reducing penetration and scattering losses. The DAS can be combined in a MIMO communication concept by treating the RRUs as a distributed antenna array or by equipping the RRUs with multiple antennas. In a possible embodiment of the DAS as shown in FIG. 2, all RRUs are connected to a BBU using an optical fiber. Each TN in a cell $C_i$, $C_j$ can comprise an associated PM, being equipped with multiple antennas.

Figure 3:
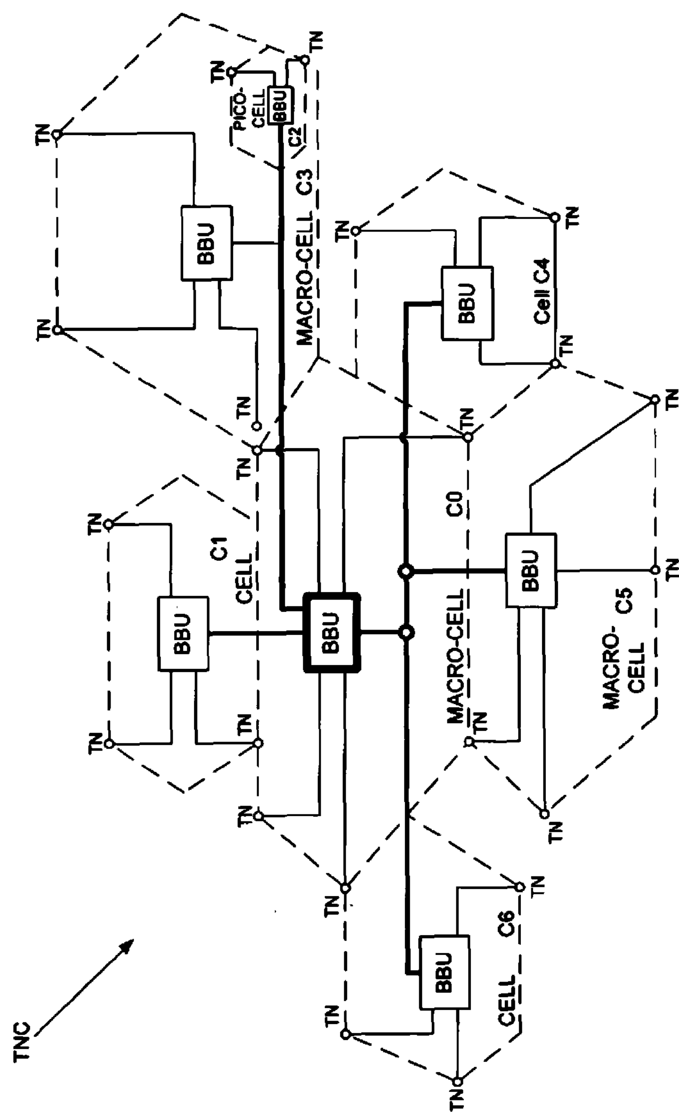
FIG. 3 is a schematic diagram of an exemplary implementation of an example of a wireless cellular heterogeneous network according to an embodiment of the present invention.

Several TNs can form a TNC as illustrated in the example of FIG. 3. FIG. 3 shows a more complex wireless cellular heterogeneous network with several cells C0 to C6 of different size and form with a different number of TNs in each cell. In the example of FIG. 3 a macrocell C0 of the wireless cellular heterogeneous network is located at a center of a TNC and surrounded by other cells C1, C2, C3, C4, C5, C6. The neighbouring cells to the macrocell C0 can be also macrocells such as the macrocell C3 or the macrocell C5 but also cells of smaller size such as the microcells C4 or C6. The neighbouring cells can also comprise picocells such as the cell C2. In a possible implementation as shown in the example of FIG. 3, the smaller cells can also be located within the area of a larger cell. For example, the picocell C2 is located within the area of the macrocell C3. In the implementation shown in FIG. 3 each cell $C_i$ comprises its own BBU which can be connected to the other BBUs of the other cells by a backhaul network, to exchange messages between the BBUs of the different cells $C_i$. These messages can contain control information and coordination information. In a possible implementation the exchanged messages contain coordination information comprising the PM indicators of PMs used by the different BBUs for precoding. To each BBU one or several TNs having RRUs can be connected as illustrated in FIG. 3. These TNs having at least one RRU can be located at the fringe or edge of the respective cell but also at any location within the respective cell $C_i$. The TNs can be also placed directly at the location of the respective BBU of the cell. Accordingly, each BBU can also form part of a TN having at least one RRU. Each RRU can have at least one or several transmitting and receiving antennas for uplink and downlink communication with a UE registered with the base station of the respective cell. The BBUs shown in FIG. 3 can be located at the base station of the respective cell $C_i$. A TNC can consist of a set of cells $C_i$ each having one base station with an integrated BBU. The number of cells $C_i$ which form the TNC can vary. In a possible implementation the cells of the TNC can be preconfigured. The selection of the cells belonging to the same TNC can be performed depending on the structure and requirements of the backhaul network connecting the BBUs of the different cells $C_i$ with each other. The number of TNs in each cell $C_i$ can also vary. Moreover, the number of used RRUs within each TN and the number of antennas for each RRU can also be different for different implementations of the wireless cellular heterogeneous network. The TNC shown in FIG. 3 consists of TNs of neighbouring cells C0 to C6. The TNC can comprise one or several rings of cells around an anchor cell of the respective TNC. In the example, the macrocells C0 with its BBU can form an anchor cell, wherein its BBU operates as a coordinating BBU for the other BBUs within the same TNC. Accordingly, in the wireless cellular heterogeneous network as shown in the example of FIG. 3 at least one BBU of the TNC has access to generic hierarchical precoding CBs. These generic hierarchical precoding CBs include CPMs constructed on the basis of the PMs of the TNs. Each constructed CPM is provided for a possible combination of active TNs within the TNC. Each CPM provided for a possible combination of active TNs within the TNC is constructed on the basis of the PM associated with the active TNs within the TNC. All constructed CPMs having the same rank form a generic hierarchical precoding CB for the respective TNC. Each constructed CPM comprises in a possible implementation form of the wireless cellular heterogeneous network an associated PMI.

The TNC such as shown in the exemplary implementation of FIG. 3 is adapted to support different spatial layers provided for data transmission between at least one TN of the TNC and at least one UE registered with any TN of the TNC. In a possible implementation of the wireless cellular heterogeneous network the network can operate in a closed loop OM. In this closed loop OM the UE analyses the channel conditions of each transmitting antenna of a TN including the multipath conditions. A UE can provide a RI as well as a PMI which determines the optimum CPM for the current channel conditions. The UE further can provide a CQI for the given RI and a PMI. This allows the base station of the cell to quickly and effectively adapt the transmission to channel conditions. The PMI can comprise wideband or sub band information data. Also, the CQI can be based on wideband or sub band information. Each UE moving in the area of the wireless cellular heterogeneous network provides feedback data comprising a PMI, a CQI and a RI. Based on the received feedback from the UE registered with a cell of the wireless cellular heterogeneous network, a scheduling entity decides to provide resources in the time/frequency/space for a set of UEs within the network. In a possible implementation each base station such as an eNodeB of an LTE network can select its UEs following its own scheduling policies based on the feedback. Control information (which may include some parts of the feedback) is exchanged between the heterogeneous TNs in order to achieve a coordination between the nodes.

The constructed CPMs of a generic hierarchical precoding CB can be stored in a memory or database to which at least one BBU of the wireless cellular heterogeneous network has access. This BBU can be a coordinating BBU for example the BBU of macrocell C0 in the TNC shown in the example of FIG. 3. The constructed CPM of a TNC is formed in a possible implementation form by a N×M matrix comprising the PMs of all active TNs within the TNC, wherein N is the number of TNs in the TNC and M is the number of supported spatial layers in the TNC, wherein M≤N.

The rank R of the constructed CPM of the TNC corresponds to the number of active TNs in the TNC, if each of them provides an independent spatial layer, with R≤N.

The number Z of all constructed CPM having the same rank, and forming a generic hierarchical precoding CB of the respective TNC is given by:

$$Z = \frac{N!}{(N-A)!A!},$$

where N is the number of all TNs in the TNC and A is the number of the active TNs in the TNC, wherein A is equal to R.

In a possible implementation form each PM of a TN included in the constructed cluster CPM of the TNC is formed by a T×L matrix, where T is the number of antenna of the respective TN and L is the number of spatial layers supported by the TN with L≤T. In a possible implementation form the PM of a TN included in a constructed CPM of the TNC is adjustable by the BBU of the respective TN. In contrast, the constructed CPM of a TNC can be stored in a CB memory of a coordinating BBU such as the BBU of the macrocell C0 shown in FIG. 3 within the TNC. In a possible implementation form the constructed CPM can be adjustable by the coordinating BBU.

Figure 4:
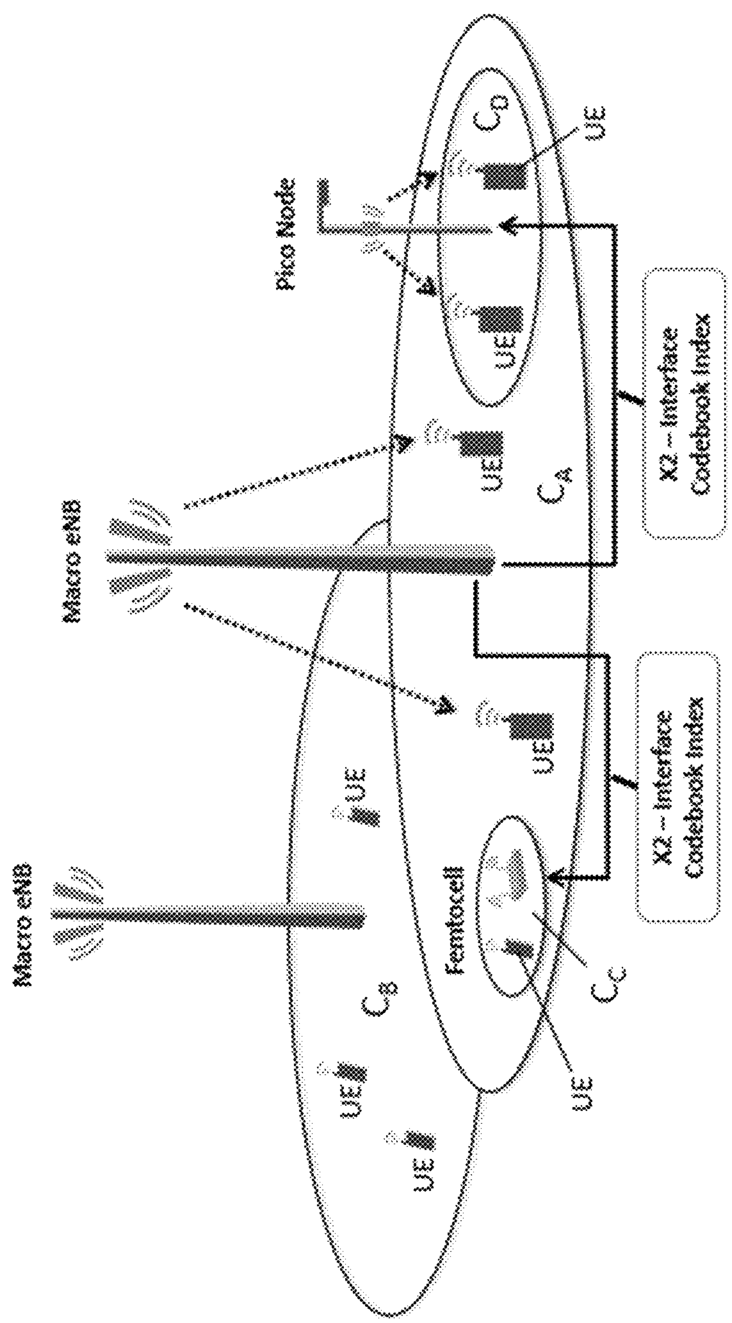
FIG. 4 shows a diagram for illustrating a possible exemplary implementation of a wireless cellular heterogeneous network according to an embodiment of the present invention.

FIG. 4 shows a diagram for illustrating a possible exemplary implementation of a wireless cellular heterogeneous network according to an embodiment of the present invention. In the shown embodiment the wireless cellular heterogeneous network is formed by an LTE network having several eNodeBs as base stations. Each eNodeB can comprise a BBU connected with each other via an X2 interface of the LTE network. As can be seen in FIG. 4, the different cells of the wireless cellular heterogeneous network can overlap each other. The wireless cellular heterogeneous network shown in FIG. 4 comprises four different cells $C_A$, $C_B$, $C_C$, $C_D$, wherein the cells $C_A$, $C_B$ are macrocells which can overlap each other, as illustrated in FIG. 4. Further, a femtocell and a picocell $C_D$ are provided having a base station connected via an X2 interface to the BBU of base station of the first macrocell $C_A$. To each base station one or several UE can be registered. In a possible implementation form the eNodeB of the macrocell $C_A$ can comprise a BBU operating as coordinating BBUs and having access to a CB memory which stores the constructed cluster PMs of a TNC comprising the cells $C_A$, $C_B$, $C_C$, $C_D$, as illustrated in FIG. 4.

The wireless cellular heterogeneous network as shown in the examples of FIGS. 3, 4 can operate in a possible implementation form in different OMs. These OMs can comprise a PTP-OM and a MTP-OM. In the PTP-OM the UE registered with a TN of the TNC has a transmission link to a single TN of the TNC to receive a signal transmitted by the TN via the air link to the registered UE.

In contrast, in an MTP-OM the UE registered with a TN of the TNC can have transmission links to a scalable number of TNs within the cluster TNC. Via each transmission link an identical signal is transmitted by the respective TN to the UE. In a possible embodiment the coordinating BBU of the TNC is adapted to select the OM used by the registered UE depending on at least one calculated signal quality metric. This signal quality metric can comprise a SNR and/or a SINR. In a further possible implementation form the OM is not only selected depending on at least one calculated signal quality metric of a reception signal at the registered UE but also on the basis of reception signals of other UEs registered with a TN of the TNC. In a possible implementation form of the wireless cellular heterogeneous network the coordinating BBU of the TNC is adapted to select a hierarchical precoding CB for the selected OM. A coordinating BBU can then select a constructed CPM within the selected hierarchical precoding CB, depending on the signal quality metric of a reception signal at the registered UE. In a possible implementation form of the wireless cellular heterogeneous network according to an embodiment of the present invention, the coordinating BBU of the TNC is adapted to offer different hierarchical precoding CBs in different time slots to the registered UEs. The registered UE is adapted to select a constructed CPM within the offered hierarchical precoding CB, depending on a signal quality metric of a reception signal at the registered UE. The backhaul interface or backhaul network provided between the BBUs of the base stations within the TNC is used to exchange messages and control information between the BBUs. The backhaul interface can comprise a reserved minimum bandwidth to exchange messages with control information relating to selected CPMs. This reserved minimum bandwidth can depend on the total number of constructed CPM in all hierarchical precoding CBs of any rank. The wireless cellular heterogeneous network as shown in the example of FIG. 3 can be an LTE network. The wireless cellular heterogeneous network can also be formed by a WIMAX network or a UMTS network.

The wireless cellular heterogeneous network uses generic and hierarchical CBs each consisting of a set of CPM to support a different number of active data streams or spatial layers from different TNs. These layers can be assigned to single or multiple UEs. Each TN can comprise its own PM.

For instance, the PM can be a 2×2 matrix representing a precoder for two antennas of a first TN within the heterogeneous network. For example, the $TN_A$ can have a DFT PM with:

$$A = \alpha\begin{bmatrix} 1 & 1 \\ j & -j \end{bmatrix},$$

where α is a power factor representing an individual power allocation for this TN. The PM can depend on the heterogeneous power distributions among the TNs involved in the precoding. For example, if the wireless cellular heterogeneous network comprises four different TNs, $TN_A$, $TN_B$, $TN_C$, $TN_D$ the different TNs have an associated PM enumerated as A, B, C, D. The TNs of the heterogeneous wireless network can have a different number of transmit antennas with corresponding power factors α, β, γ, δ, following their individual and independent transmit power constraints.

Figure 5:
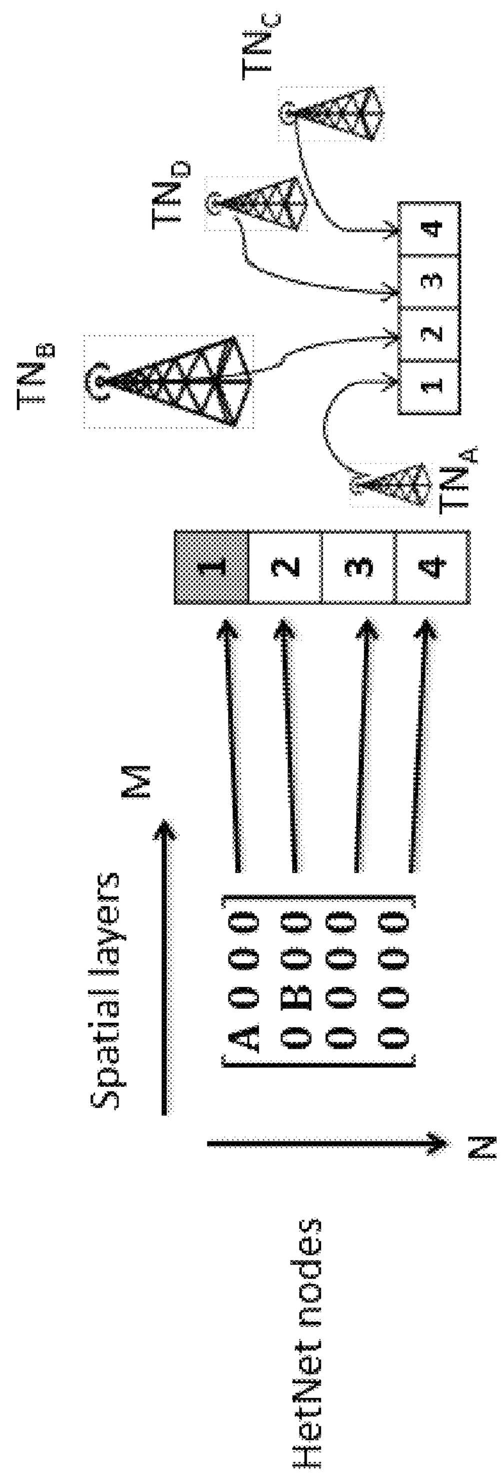
FIG. 5 shows a diagram for illustrating the generation of generic hierarchical precoding CBs in a DAS as performed.

FIG. 5 shows a simple example for constructing a generic precoding CB for a heterogeneous network having four different TNs and supporting a corresponding number of spatial layers. Accordingly, in the given example as illustrated in FIG. 5 by four TNs $TN_A$, $TN_B$, $TN_C$, $TN_D$, a predetermined number of M=4 spatial layers are supported in the respective network. The constructed cluster CPM is a N×M matrix comprising the PMs of all active TNs of the TNC, wherein N is the number of TNs in the TN cluster and M is the number of supported spatial layers in the TNC, with M≤N. In the example of FIG. 5 the number of TNs is N=4 and the number of spatial layers is M=4.

In the example of FIG. 5, if the first $TN_A$ and the second $TN_B$ of the wireless cellular heterogeneous network is active, whereas the other TNs $TN_C$ and $TN_D$ are inactive, the CPM can be provided as illustrated in FIG. 5 encompassing PMs A and B of the active TNs, $TN_A$ and $TN_B$. CPMs are provided for all possible combinations of active TNs within the TNC, comprising the TNs $TN_A$, $TN_B$, $TN_C$, $TN_D$ in the example of FIG. 5.

FIG. 7 shows an overview of all possible CPM which can be used for precoding in a wireless cellular heterogeneous network with four different TNs $TN_A$, $TN_B$, $TN_C$, $TN_D$ allowing for transmission on one up to four spatial layers (ranks 1 to 4). The rank indicates the number of active TNs in the respective TNC, each one providing a spatial layer. All constructed CPMs having the same rank form a generic hierarchical precoding CB for the respective TNC. In the example shown in FIG. 7, there are four different generic hierarchical precoding CBs CB1, CB2, CB3, CB4, each having a predetermined number of CPMS. The maximum rank R=4 corresponds to the number of possible active TNs in the TNC. The number Z of all constructed CPM having the same rank and forming a generic hierarchical precoding CB for the respective TN cluster is given by:

$$Z = \frac{N!}{(N-A)!A!},$$

wherein N is the number of all TNs in the TNC and A is the number of active TNs in the respective TNC, wherein A is equal to the rank R, as each TN can provide an independent spatial layer for transmission. In the example shown in FIG. 5 a TNC comprises four TNs $TN_A$, $TN_B$, $TN_C$, $TN_D$ each having a corresponding PM A, B, C, D. Accordingly, the number N of the number of all TNs in the TN cluster is N=4. The number A is the number of active TNs in the respective TNC and corresponds to the rank. Accordingly, with rank R=1, the number of active TNs in the TN cluster gives A=1 and the corresponding CB CB1 for the respective rank comprises $$Z = \frac{4!}{(4-3)!1!} = 4,$$

i.e. 4 cluster PMs PCM for rank R=1. FIG. 7 shows the four different CPMs of the generic hierarchical precoding CB1 for rank 1. If only one of the TNs $TN_A$, $TN_B$, $TN_C$, $TN_D$ is active, one of the four cluster PMs of the first hierarchical precoding CB1 can be used. FIG. 7 shows also the other cases where two different TNs are active (rank=2), where three different TNs are active (rank=3), and where all four TNs are active at the same time (rank=4). If all TNs are active at the same time, there is only one CPM encompassing all the PMs A, B, $C_j$ D of the four different active TNs $TN_A$, $TN_B$, $TN_C$, $TN_D$. Consequently, the fourth hierarchical precoding CB4 consists only of one constructed CPM, as illustrated in FIG. 7.

Figure 6:
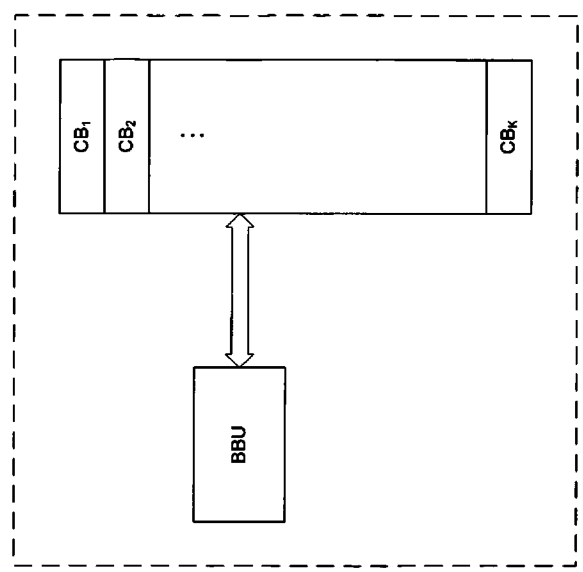
FIG. 6 is a schematic diagram for illustrating the operation of an exemplary embodiment of a BBU of a TNC, according to the present invention.

FIG. 6 shows a block diagram of a BBU having access to a CB memory storing a different number of hierarchical precoding CBs $CB_i$. In the example of FIG. 7 the CB memory can store four different generic hierarchical precoding CBs CB1, CB2, CB3, CB4 for the different ranks 1 to 4, wherein each generic hierarchical precoding CB comprises a number Z of CPM having the same rank. As can be seen in FIG. 7, the constructed CPMs are formed by N×M matrices comprising the PMs of all active TNs of the TNC, wherein N is the number of TNs in the TNC and M is the number of supported spatial layers in the TNC, with M≤N. In the example of FIG. 7 the number of TNs in the TN cluster is N=4 and the number of supported spatial layers in the TN cluster is M=4.

Each PM of a TN included in the constructed CPM of the TNC is a T×L matrix, wherein T is the number of antenna of the respective TN and L is the number of spatial layers supported by the respective TN with L≤T. For example, a PM can be a 2×2 matrix for a TN having two antennas and supporting two spatial layers. Accordingly, each of the PMs A, B, C, D shown in the example of FIG. 7 can be formed by a T×L matrix, for instance a 2×2 matrix.

FIG. 8 shows the precoding CBs in a wireless cellular heterogeneous network, wherein the TNs each comprise only one antenna. In this simple case the RRUs of the TN comprise a single antenna and the PM of the respective TN is a 1×1 matrix with the value 1 as illustrated in FIG. 8. In contrast, if each RRU is equipped with a 2-antenna transmitter each RRU can transmit up to two spatial layers. The selection of using either one or two spatial layers at any given RRU can be performed for each RRU independently. In addition to a rank per RRU one can introduce also a so-called RRU rank denoting the amount or number of RRUs being involved in a multi-user SDMA or PU2RC according to the LTE terminology. Accordingly, in case of RRU-rank 2 the CPM can for example have the following structure:

$$\left[\begin{bmatrix}1&1\\j&-j\end{bmatrix}\begin{matrix}0&0&0\\0&0&0\\0&\begin{bmatrix}0&1\\0&-j\end{bmatrix}&0\\0&0&0\end{matrix}\right]\left[\begin{bmatrix}1&1\\j&-j\end{bmatrix}\begin{matrix}0&0&0\\0&0&0\\0&\begin{bmatrix}0&1\\0&-j\end{bmatrix}&0\\0&0&0\end{matrix}\right]$$

$$\left[\begin{matrix}\begin{bmatrix}1&1\\j&-j\end{bmatrix}&0&0&0\\0&0&0&0\\0&0&\begin{bmatrix}0&1\\0&-j\end{bmatrix}&0\\0&0&0&0\end{matrix}\right]\left[\begin{matrix}\begin{bmatrix}1&1\\j&-j\end{bmatrix}&0&0&0\\0&0&0&0\\0&0&\begin{bmatrix}0&1\\0&-j\end{bmatrix}&0\\0&0&0&0\end{matrix}\right],$$

wherein 0 indicates a 2×2 matrix with zero entries. The beam formers per each RRU, i.e. the PMs A to D illustrated in FIG. 7, can be adapted to any desired CPM. All potential constellations are shown in FIG. 9.

In an embodiment of the wireless heterogeneous network according to the present invention the network can be operated in a PTP-OM and alternatively, in a MTP-OM. In a PTP-OM a UE registered with a TN of the TNC has a transmission link to a single TN of the INC, to transmit and receive a signal. With such a PTP-OM the generic hierarchical precoding CBs as illustrated in FIG. 7, 8 or 9 can be used.

In contrast, in an MTP-OM a UE registered with a TN of the TNC has transmission links to a scalable number of TNs within the TNC, wherein through each transmission link an identical signal can be transmitted to the respective UE. The selection of TNs for a service in the MTP-OM can depend on the channel gains experienced by the UEs. If, for example, a UE can receive a significant reception signal from two TNs only, it does not make sense to serve this UE sending a signal from all the TNs of the TNC.

The application of MTP-OM in CPMS are suitable for UEs with similar channel gain to a subset of all transmit antennas available at the RRUs or for highly mobile UEs in order to reduce a frequency of cluster PM switching.

FIG. 10 shows the CB structure for MTP-OM of a wireless cellular heterogeneous network. In the example of FIG. 10 the CB structure is illustrated for single-antenna TNs for sake of simplicity so that all PMs used in the construction of the CPM are simple 1 to 1 matrices with a value 1, as illustrated in FIG. 10. The scheme shown in FIG. 10 can easily be extended to the case of multi-antenna TNs in that the single antenna matrices are substituted by PMs A, B, C, D in the case of a TNC having four different TNs $TN_A$, $TN_B$, $TN_C$, $TN_D$. The rank indicates the number of active spatial layers in a MTP-OM, where now each layer may be provided by multiple TNs. In the shown example of FIG. 10 the rank=1, i.e. one spatial layer is active. In the first generic hierarchical CB CB1 (2SFN), there are two TNs supporting one spatial layer by linking the UE to two TNs, for instance, TNs $TN_A$ and $TN_B$. The second CB2 comprises CPMs linking the UE to three different TNs of the TNC. Finally, the third CB3 links the UE simultaneously to all four TNs TNA to TND of the TNC. The fourth CB4 (R2SFN) allows to link two separate UEs to two different TNs of the TNC each. For example, a first UE1 has links to TNs TNA, TNB, whereas a second UE2 has links to the third $TN_C$ and the fourth TND.

Figure 11B:
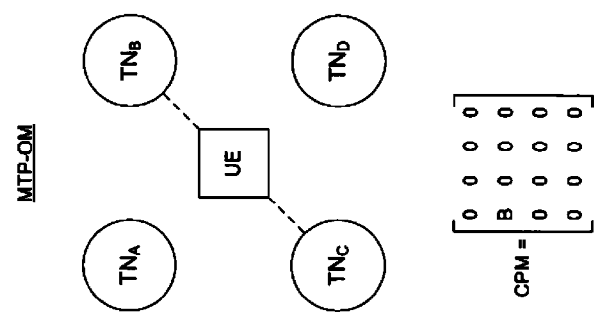
FIGS. 11A and 11B show specific examples of constructed cluster PMs used in different OMs of the wireless cellular heterogeneous network and a corresponding diagram of a UE registered with active TNs of the wireless cellular network.
Figure 11A:
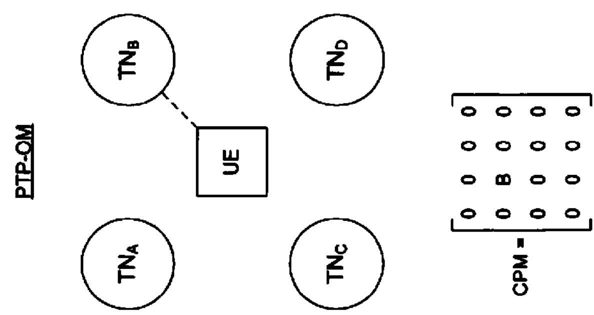

FIGS. 11A, 11B illustrate the different OMs of the wireless cellular heterogeneous network according to an embodiment of the present invention. FIG. 11A shows a PTP-OM, wherein a UE has a link to a single $TN_B$. FIG. 11A shows the corresponding CPM including the PM of the $TN_B$.

In contrast, in a MTP-OM the UE is not connected to a single TN but can be connected to several TNs such as nodes $TN_B$, $TN_C$, wherein through each transmission link an identical signal is transmitted to the UE in a downlink.

FIG. 11B shows a corresponding CPM including the PMs B, C of the two TNs $TN_B$, $TN_C$, to which the UE is linked simultaneously.

Figure 12:
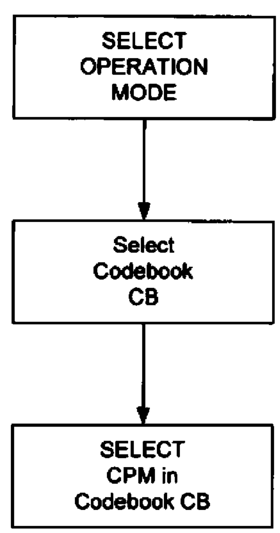
FIG. 12 shows a flow chart of a possible implementation of a method for providing generic hierarchical precoding CBs in a DAS.

FIG. 12 shows a flow chart of a possible implementation of a selection process to select a CPM within a generic hierarchical precoding CB. As illustrated in FIG. 12, the selection process can comprise one or several steps. In the implementation shown in FIG. 12 there are three selection steps. In a first selection step the OM is selected. The OM can comprise a PTP-OM or a MTP-OM. In a further selection step a generic hierarchical precoding CB is selected. In a final step a CPM within the selected generic hierarchical precoding CB is selected, as illustrated in FIG. 12. The selection steps shown in FIG. 12 can be performed by the same or different entities within the wireless heterogeneous network. Since each CPM is assigned an associated PMI it can be selected by the entity by means of its associated PMI.

With the wireless cellular heterogeneous network according to an embodiment of the present invention, it is possible to include a variable number of TNs with a variable number of antennas used to serve a registered UE. Depending on different user locations of the UE and data traffic requirements, the wireless cellular heterogeneous network can be flexibly adapted to time-bearing needs. In general, the path loss to the distinct TN locations yields the fact that the UEs of the different users receive a reception signal from the different TNs at different power levels. This effect results in a heterogeneous transmit power distribution over the TNs within the wireless cellular heterogeneous network. Consequently, each UE is connected mainly to a single or small set of remote RRUs within different TNs of the wireless cellular heterogeneous network. By activating multiple antennas of different RRUs within different TNs an instantaneous multiuser service can conveniently be achieved in these setups. By using generic hierarchical precoding CBs, each having a set of CPMs, a co-channel interference can be made predictable at different hierarchical levels. In addition, using a CB-based precoding allows for a coordinated beam forming and scheduling, CSCB, for all transmit antennas which are grouped in the virtual DAS setup. The coordinated beam forming and scheduling is an effective technique for joint signal optimization and interference management.

Figure 13:
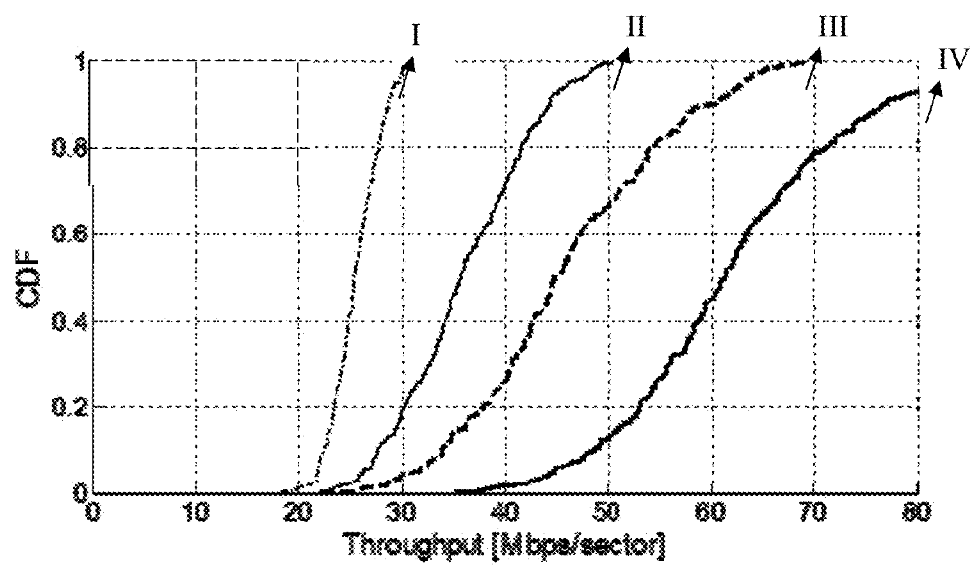
FIGS. 13 and 14 show cumulative distribution functions for illustrating a performance when employing different hierarchical precoding CBs in a DAS.

The generic hierarchical precoding CBs can be used from either centralized or even hierarchical remote radio management in the heterogeneous network. FIG. 13 shows a diagram for illustrating the performance of CBs in a DAS implemented in a wireless cellular heterogeneous network. FIG. 13 shows the cumulative distribution function of the throughput of the TNC for different ranks of employed CBs. It can be seen that the overall throughput per sector is higher if CBs of higher rank are selected. In the example of FIG. 13 there are four generic hierarchical precoding CBs of different ranks, wherein curve I shows the situation when using CB of rank 1, curve II shows the situation when using CB of rank 2, curve III shows the situation when using CB of rank 3, and curve IV shows the situation when using CB of rank 4.

FIG. 13 shows the throughput of data for each TNC.

Figure 14:
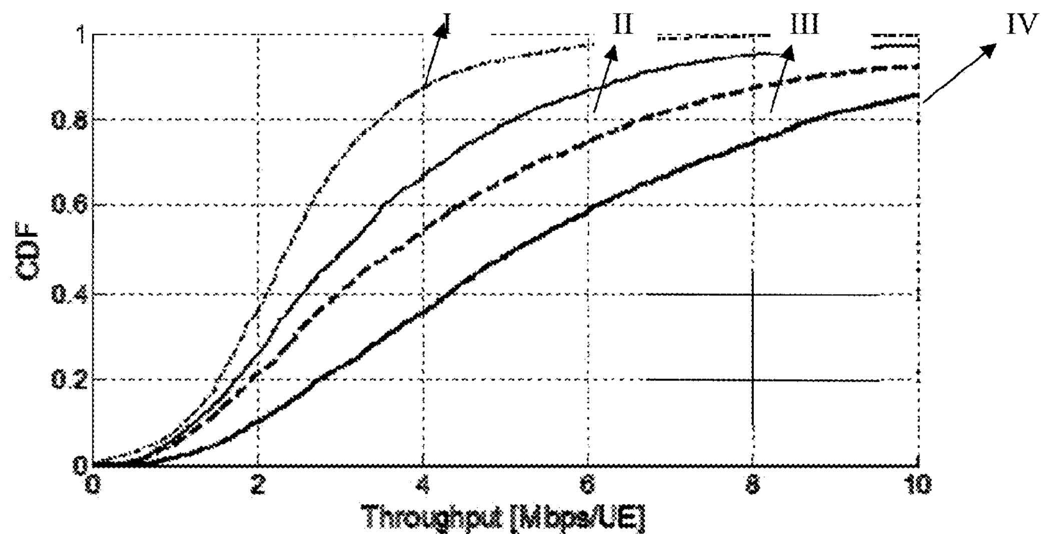

In contrast, FIG. 14 shows the throughput of data per each UE registered with a TN of a TNC.

As can be seen from FIGS. 13, 14, the data rates scale with the number of active data streams or layers within the TNC. FIGS. 13, 14 show curves I, I, II, IV for DAS rank 1, rank 2, rank 3, rank 4, respectively. Further, the data throughput can be easily adapted to the demands of the UE. This can be achieved in that the BBU switches to different generic hierarchical precoding CBs.

As illustrated in FIG. 15, CBs of different rank can be provided for different OMs each having a different number of CPMs. In the special case that the RRUs each have a single transmit antenna, the RRU selection can be considered as an antenna selection matrix. For multiple antennas per each remote radio unit one can use block-diagonal CPMs where DFT or householder beams may be used per each block. Each block refers to the antennas located at the same remote radio unit.

The CBs for the MTP-OM can be used when the UE experiences a rather similar channel gain to a subset of different remote radio units with their respective antennas. Further, the CBs with the MTP-OM can be employed when the different UEs move fast through the deployment. Using the MTP-OM CBs in this case reduces the effect of delayed PMIs feedback, since the connection to a subset of RRUs and the antennas varies less dynamically compared to a single RRU of a TN. The wireless cellular heterogeneous network provides a hierarchical CB design for a multi-user service in a virtual DAS. Cells C, of a TNC form a virtual supercell with a plurality of TNs to provide an optimal reception signal for a UE within the TNC.

FIG. 16, 17, 18 show SINR coverage plots in a cell to illustrate different scenarios when performing the method according to the present invention.

FIG. 16 shows simulation results when performing a rank 1 transmission in a 4-DAS setup. FIG. 16 shows SINR coverage plots with single data stream transmission, using single RRU selection or joint/coherent transmission from two or four RRUs. According to these SINR coverage plots, a single data stream is transmitted from a single transmit node RRU during a particular time sample. The plots are obtained using antenna characteristics and path loss effects without considering any large- and small-scale fading. In the case of 2SFN, two RRUs are active and transmit coherently the same data.

FIG. 17 shows simulation results when performing a rank 2 transmission in a 4-DAS setup. FIG. 17 shows a rank 2 transmission with single RRU selection or joint selection. In FIG. 17, two parallel data streams are allowed. The CBs consider RRU selection (top), where each data stream is generated by a single RRU. In contrast, 2SFN R2 sets up two regions, where two RRUs are coherently transmitting data. This mode is of particular interest to support users with higher mobility between the virtual cell borders, which would open up if all RRUs transmit independent data streams, also referred to as Rank 4 transmission shown in FIG. 18.

Figure 18:
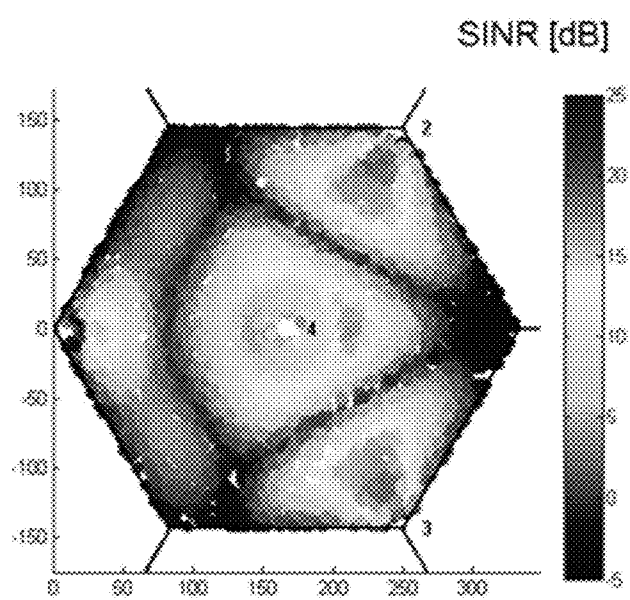

FIG. 18 shows simulation results when performing a rank 4 transmission in a 4-DAS setup.

In the Rank 4 case each RRU generates a single data stream only. In this case the most intra-cell interference is generated, i.e. the interference between RRUs connected to the same BBU.

As can be seen from FIG. 16 in a single cell with three RRUs located in the corners of the cell and one RRU in the middle, the simulation results show that the SINR is best when a rank 4 transmission is chosen (see FIG. 16 below). For other topologies it may be different.

As illustrated in FIG. 3, the BBUs of the different cells within a TNC are connected to each other by means of a backhaul network or backhaul interfaces. This backhaul interface is adapted to exchange messages between the BBUs for coordinating the operation between the different cells of the wireless cellular heterogeneous network. The backhaul interface or network provided between the BBUs of the TNC comprises a minimum bandwidth to exchange messages with control information related to selected CPMs of generic hierarchical precoding CBs. This minimum bandwidth depends on the total number of constructed CPMs in all hierarchical precoding CBs of any rank. A load L of data transported via the backhaul network of the wireless cellular heterogeneous network can transport control information and can be calculated for a typical system setup as follows: If, for instance, the wireless cellular heterogeneous network comprises four TNs each having two antennas, 13 sub bands or frequency bands and a switching interval of 10 ms in a case where 29 CPMs are provided in different OMs as illustrated in FIG. 15, it is necessary to transport 5 bit per each sub frame as control data via the backhaul network of the wireless cellular heterogeneous network. Accordingly, in such a scenario, the backhaul load L can be calculated as follows:

$$L = 5bit \cdot 13subbands \cdot \frac{1000\text{ ms}}{10\text{ ms}} = 6.5\ kbit/s$$

As can be seen the backhaul load of control information exchanged between the BBUs of the wireless cellular heterogeneous network is relatively low and the occupied bandwidth BW of the backhaul network is small.

The combination of different PMs of TNs in a CPM allows transmission of multiple spatial layers to either a single user or to multiple users. With the method for providing generic hierarchical precoding CBs in a DAS of a wireless cellular heterogeneous network it is, for example, possible to combine standard PMs of standard precoding CBs for a different number of antenna ports into CBs comprising CPMS of a complete TNC. Hierarchical radio resource management can be provided, where macro base stations having coordinating BBUs define the CPMs, according to proposed hierarchical CBs and the scheduling of UEs to these layers can be carried out in a decentralized fashion at each of the TNs within the wireless cellular heterogeneous network. By using CPMs the cells $C_i$ of the TNC form a virtual supercell in a virtual DAS. Based on the generic hierarchical precoding CBs, each having a set of CPMs a mechanism can be established to actively control the signal and the co-channel interference in the heterogeneous network. In a further implementation, a central scheduling entity can be provided located in at least one coordinating BBU which controls the access to all its RRUs or TNs e.g. pico, femto or even relay nodes. With the method according to an embodiment of the present invention, it is possible to define different generic hierarchical precoding CBs in a generic manner, i.e. for each TN using the same design rules. The structure of the CPMs of the different generic hierarchical precoding CBs take into account the heterogeneous nature of the wireless cellular heterogeneous network in terms of power, cell size and channel gain at different TNs. The next higher cell hierarchy defines which of the TNs will serve a UE on correspondingly selected spatial layers and thus it also defines which type of precoder has to be used within the next lower entities. Accordingly, this forms a hierarchical CB design which can be used in a hierarchical radio resource management of the wireless cellular heterogeneous network. Since the usage of the generic hierarchical precoding CBs is controlled in a possible implementation by a next higher cell hierarchy, scheduling can be carried out at each TN independently for downlink resources in the time/frequency and spatial domain. Consequently, in a possible implementation of the wireless cellular heterogeneous network a centralized scheduling is not required. In a possible implementation the macro-BBU or coordinating BBU suggests a specific generic hierarchical precoding CB while the selection of the UE can be carried out in each TN independently. In a possible implementation of the DAS where the different RRUs are connected over fiber to a corresponding BBU radio resource management, scheduling can be carried out in the same central entity of the network (i.e. that BBU). In a possible implementation hierarchical precoding CBs each having a set of CPMs is offered to the UE. In an alternative implementation, not all generic hierarchical precoding CBs are offered to UEs but only those generic hierarchical precoding CBs of a specific type. In a possible implementation the selection of a cluster PM within a generic hierarchical precoding CB is performed by a registered UE. In an alternative implementation form the selection of a CPM within a hierarchical precoding CB can also be performed by the BBU of the respective cell C to which the UE is registered.

In a possible implementation of the wireless cellular heterogeneous network only a specific coordinating BBU within the TNC has access to the generic hierarchical precoding CBs. In an alternative implementation all BBUs of the different cells $C_i$ within the wireless cellular heterogeneous network have access to the generic hierarchical precoding CBs.

The present disclosure also supports a computer program product comprising computer executable code or computer executable instructions that, when executed, causes at least a computer to execute the method according to the present invention.

In a possible implementation more than two hierarchical levels can be provided. In a possible implementation several TNCs each comprising a group of cells can in turn be clustered to a TNC of a higher hierarchy level. The generic hierarchical precoding CBs of this supercluster comprising several TNCs can each have a set of CPMs of a higher level constructed from the CPMs of the lower level. Each PM can be adapted in a possible implementation by an entity of the respective hierarchy level. For instance a PM of a TN can be adjusted by a BBU of the respective cell where the TN is provided. A CPM consisting of different PMs can be adjusted by an entity of the TNC for instance by a coordinating BBU of a macrocell at the center of the TNC, as illustrated in the example of FIG. 3. In this way, a hierarchical system of PMs is provided which is at the same time flexible and can take into account local requirements at lower hierarchy levels.

What is claimed is:

1. A base band unit (BBU), which is provided in a cluster of transmission nodes (TNs) of neighbouring cells of a wireless cellular heterogeneous network,
 wherein the BBU is a coordinating BBU of the cluster of TNs and the BBU comprises:
 a processor and a non-transitory, processor readable memory storing instructions for execution by the processor such that, when the processor executes the instructions, the processor is configured to select an operation mode (OM) used for a registered user equipment (UE) according to at least one of the following: (a) a calculated signal quality metric of a reception signal at the registered UE and (b) reception signals of other UEs registered with a TN of the cluster of TNs; and
 a memory for storing generic hierarchical precoding codebooks (CBs), each CB comprising a cluster of precoding matrices (PMs), and the cluster of PMs describes active TNs within the cluster of TNs,
 wherein the cluster of PMs is formatted as a N×M matrix, where N is the number of TNs in the cluster of TNs and M is the number of supported global spatial layers in the cluster of TNs, with M being less than or equal to N.

2. The BBU according to claim 1, wherein each cluster of the PMs is constructed on the basis of PM associated with the active TNs.

3. The BBU according to claim 2, wherein the cluster of PMs having a same rank form a generic hierarchical precoding CB for the respective cluster of TNs.

4. The BBU according to claim 1, wherein the cluster of PMs having a same rank form a generic hierarchical precoding CB for the respective cluster of TNs.

5. The BBU according to claim 1, wherein a rank (R) of the cluster of PMs of the cluster of TNs is associated with a quantity of spatial layers that are active in the cluster of TNs, with R≤M≤N.

6. The BBU according to claim 1, wherein a quantity (Z) of all clusters of PMs having a same rank (R) and forming a generic hierarchical precoding CB for the respective cluster of TNs is defined by:

$$Z = \binom{N}{A} = \frac{N!}{(N-A)!A!},$$

wherein N represents the quantity of all TNs in the cluster of TNs,
 wherein A represents the quantity of the active TNs in the cluster of TNs, and
 wherein A is equal to R.

7. The BBU according to claim 1, wherein the cluster of PMs of the cluster of TNs is stored in a CB memory of a coordinating BBU of the TN within the cluster of TNs and is adjustable by the coordinating BBU.

8. The BBU according to claim 1, wherein the BBU is further adapted to select a hierarchical precoding CB for the selected OM, and to select a CPM within the selected hierarchical precoding CB, according to at least one of the following: (a) a signal quality metric of a reception signal at the registered UE and (b) reception signals of other UEs registered with a TN of the cluster of TNs.

9. The BBU according to claim 8, wherein the BBU is further adapted to offer different hierarchical precoding CBs in different time slots to the registered UE, wherein the registered UE is adapted to select a cluster of PMs within an offered hierarchical precoding CB, according to a signal quality metric of a reception signal at the registered UE.

10. The BBU according to claim 1, wherein the BBU is further adapted to offer different hierarchical precoding CBs in different time slots to the registered UE, wherein the registered UE is adapted to select a cluster of PMs within an offered hierarchical precoding CB, according to a signal quality metric of a reception signal at the registered UE.

11. A wireless cellular heterogeneous network comprising:
 at least one cluster of transmission nodes (TNs) comprising TNs of neighbouring cells;
 at least one base band unit (BBU) wherein the BBU is a coordinating BBU of the cluster of TNs and the BBU comprises
 a processor and a non-transitory, processor readable memory storing instructions for execution by the processor such that, when the processor executes the instructions, the processor is configured to,
 select an operation mode (OM) used for a registered user equipment (UE) according to at least one of the following: (a) a calculated signal quality metric of a reception signal at the registered UE and (b) reception signals of other UEs registered with a TN of the cluster of TNs; and
 a memory for storing generic hierarchical precoding codebooks, each codebook (CB) comprising a cluster of precoding matrices (PMs) describing active TNs within the cluster of TNs, wherein the cluster of PMs of the cluster of TNs is formatted as a N×M matrix, where N is the number of TNs in the cluster of TNs and M is the number of supported global spatial layers in the cluster of TNs, with M is less than or equal to N.

12. The wireless cellular heterogeneous network according to claim 11, wherein the cluster of TNs is adapted to support different spatial layers provided for data transmission between at least one of the TNs of the cluster of TNs and at least one of the user equipment (UE) registered with the TN of the cluster of TNs.

13. The wireless cellular heterogeneous network according to claim 12:

wherein the wireless heterogeneous network is operated in different operation modes (OM), wherein the different OMs comprise a point-to-point OM (PTP-OM), and a multipoint-to-point OM (MTP-OM), wherein in the PTP-OM, a UE registered with a TN of the cluster of TNs has a transmission link to a single TN of the cluster of TNs, to transmit a signal to the registered UE, wherein in the MTP-OM, a UE registered with a TN of the cluster of TNs has transmission links to a scalable quantity of TNs of the cluster of TNs, and wherein through each transmission link an identical signal is transmitted to the registered UE.

14. The wireless cellular heterogeneous network according to claim 11:

wherein the wireless heterogeneous network is operated in different operation modes (OMs), wherein the different OMs comprise a point-to-point OM (PTP-OM) and a multipoint-to-point OM (MTP-OM), wherein in the PTP-OM, a UE registered with a TN of the cluster of TNs has a transmission link to a single TN of the cluster of TNs, to transmit a signal to the registered UE, wherein in the MTP-OM, a UE registered with a TN of the cluster of TNs has transmission links to a scalable quantity of TNs of the cluster of TNs, and wherein through each of the transmission links an identical signal is transmitted to the registered UE.

15. The wireless cellular heterogeneous network according to claim 11, wherein a backhaul interface provided between BBUs of the cluster of TNs comprises a minimum bandwidth being reserved to exchange messages with control information relating to a selected cluster of PMs, according to a total quantity of clusters of PMs in all hierarchical precoding CBs of any rank.

16. A method for providing generic hierarchical precoding codebooks (CBs) in a wireless cellular heterogeneous network, the wireless cellular heterogeneous network comprising at least a cluster of transmission nodes (TNs) of neighbouring cells, and comprises at least a base band unit (BBU) wherein the BBU is a coordinating BBU of the cluster of TNs and the BBU comprises a processor and a non-transitory, processor readable memory storing instructions for execution by the processor such that when the processor executes the instructions the processor is configured to select an operation mode (OM) used for a registered user equipment (UE) according to at least one of the following: (a) a calculated signal quality metric of a reception signal at the registered UE and (b) reception signals of other UEs registered with a TN of the cluster of TNs and a memory for storing generic hierarchical precoding codebooks (CBs), each CB comprising a cluster of precoding matrices (PMs), and each cluster of PMs is a N×M matrix comprising PMs of all active TNs of the cluster of TNs, wherein N is the number of TNs in the cluster of TNs and M is the number of supported global spatial layers in the cluster of TNs, with M less than or equal to N, wherein the method comprises:

selecting an OM;

selecting one of the generic hierarchical precoding CBs according to the selected OM; and selecting a cluster of PMs comprising the selected generic hierarchical precoding CB.

* * * * *